Frank M. Owen
Charles W. Pewthers
INVENTOR.

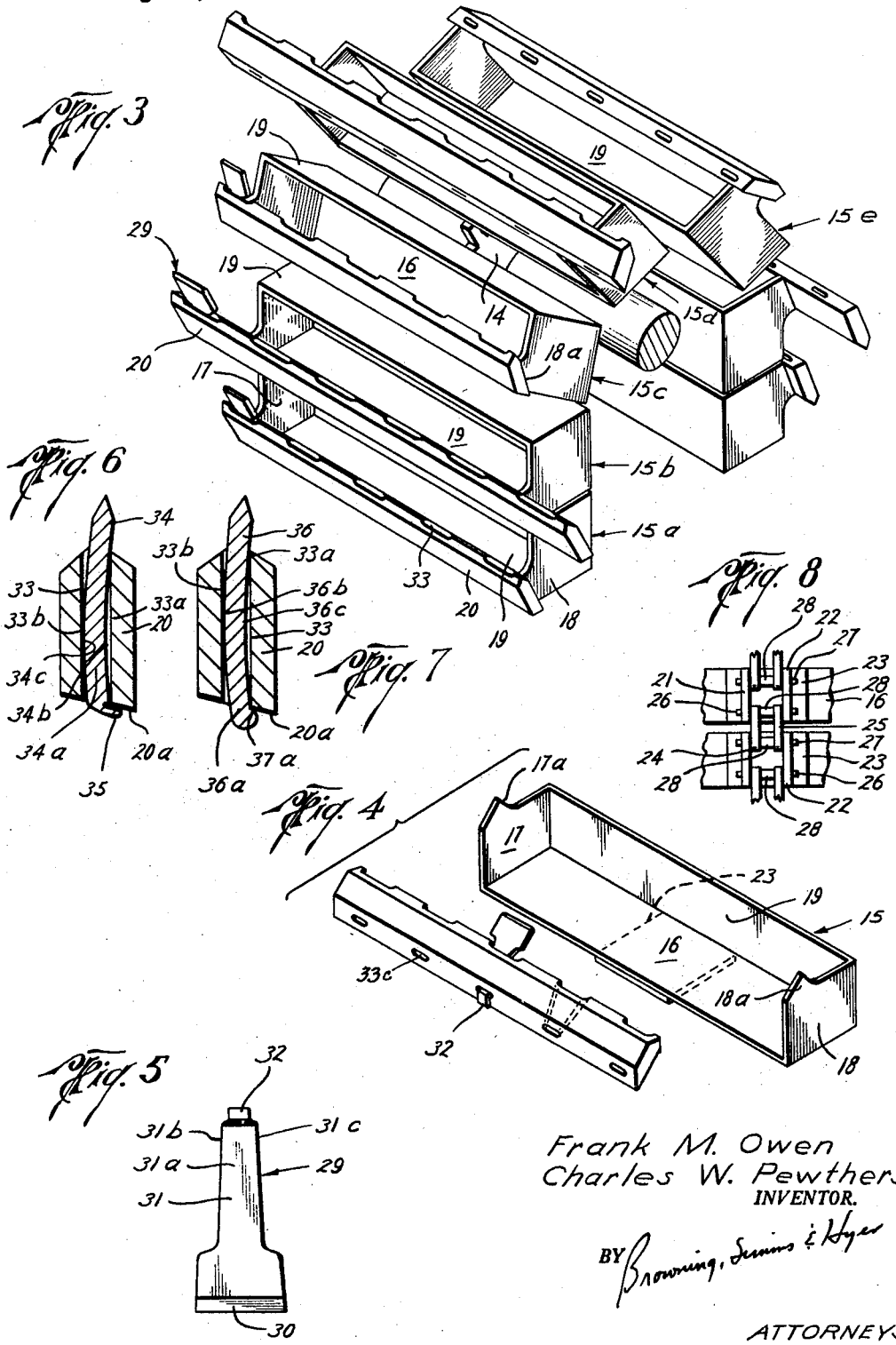

United States Patent Office 2,915,838
Patented Dec. 8, 1959

2,915,838

BUCKET LINE

Frank M. Owen and Charles W. Pewthers, Brazos County, Tex., assignors to Owen-Pewthers Manufacturing Company, Inc., College Station, Tex., a corporation of Texas Application August 18, 1954, Serial No. 450,676

7 Claims. (Cl. 37—90)

This invention relates to bucket lines for use with trenchers or the like and more particularly to the provision of self-cleaning buckets for a bucket line. In one of its aspects it relates to the mounting of a tooth in the socket of a tooth bar for use with a bucket line.

Trenchers or mechanical diggers employ an endless chain of buckets, usually referred to as a bucket line to loosen and remove material, usually referred to as spoil, from a trench. The spoil is usually discharged by the buckets passing over one of the sprockets or rollers of the bucket line where the direction of travel of the bucket is abruptly changed and the speed of the bucket increased. At the discharge sprocket, usually at the top of the bucket line, the upwardly traveling buckets will abruptly change their direction of travel as much as 180 degrees. Due to this abrupt change of direction and the centrifugal force developed by the speeded up buckets, spoil in the buckets will be discharged therefrom. However, where the spoil is soft earth, damp clay or caliche, it will stick to the bucket and some provision must be made for releasing the spoil from the bucket so that it may return to the trench empty.

Many different types of scrapers, fingers, cleaner links, and the like have been used to loosen the packed or sticky spoil from the bucket so that spoil will be discharged as the buckets pass over the discharge sprocket. While these various means of cleaning the buckets have been more or less successful, they involve the employment of additional elements which are subject to wear and which complicate considerably the bucket line. The cleaning means are usually rather weak structurally and it is not infrequent that rocks or the like dug up by the bucket line will lodge between the bucket and the scraper or the scraper and the bucket chain or sprocket and damage some portion of the bucket, usually the cleaner means element.

Most bucket lines employ removable digging teeth because these teeth are subject to considerable wear and must be frequently replaced. The teeth may be held in their sockets by an ear on the shank end of the tooth which is bent over the tooth bar to maintain the tooth in its socket. Due to the tremendous forces imposed upon these teeth both during the digging operation and due to centrifugal force as the bucket line moves over the drive and idler sprockets, these teeth tend to loosen in their sockets and be thrown out.

It is an object of this invention to provide a bucket line having buckets which are self-cleaning without necessarily providing scrapers, cleaner links or the like.

Another object is to provide a two-piece bucket, which two pieces move relative to each other as they pass through a curved portion of the bucket line to loosen spoil stuck to the bucket.

Another object is to provide a bucket for a bucket line which is bottomless during the discharge of spoil therefrom and spoil may be thrown out of the front and bottom of the bucket.

Another object is to provide, as a preferred form of this invention, a bucket line having two-piece buckets which move relative to each other as they pass through a curved portion of the bucket line to loosen spoil in the bucket wherein each bucket carries one of the pieces of the bucket next preceding it permitting the buckets to be positioned closely adjacent each other and reducing the cost of fabricating the bucket line.

Another object is to provide a bucket line having self-cleaning buckets in which the self-cleaning feature is provided without substantially increasing the cost of fabricating the bucket line.

Another object is to provide a self-cleaning bucket for a bucket line with a removable tooth bar which may be replaced when worn.

Another object is to provide a tooth bar and teeth therefor in which the teeth are deformed when inserted in the tooth bar to set up stresses in the teeth, said stresses tending to maintain the teeth within the tooth bar.

Another object is to provide a tooth bar and teeth therefor in which the teeth are stressed when inserted into sockets in the bar and wherein the teeth are provided with laterally offset lugs which pass through tooth sockets in the bar and snap over an outer wall of the bar due to the stresses in the teeth to retain the teeth in the bar.

Other objects, advantages and features of this invention will appear from a consideration of the drawings together with the written specification and claims.

In the drawings wherein there is shown by way of illustration a bucket line embodying this invention and wherein like reference numerals are used to indicate like parts:

Fig. 3 is an isometric view of the upper portion of a boom type bucket line constructed in accordance with this invention;

Fig. 4 is an isometric view of one of the buckets employed in the bucket line of Fig. 3;

Fig. 5 is a view in elevation of a digging tooth employed in the Fig. 3 bucket line;

Fig. 6 is a cross-sectional view through the tooth bar employed in the Fig. 3 bucket line showing a modified form of tooth in a tooth receiving socket of the bar;

Fig. 7 is a cross-sectional view of the tooth bar showing a further modified form of tooth; and Fig. 8 is a view in vertical elevation of a fragment of the back side of a bucket line showing a preferred form of attachment of the several buckets in the bucket line.

The self-cleaning bucket line of this invention is characterized by the provision of a two-piece bucket wherein the bottom of the bucket is separate from the remainder of the bucket and is secured to the bucket line in a manner to permit it to form a bottom for the bucket while the bucket is in a straight section of the bucket line and wherein the two pieces of the bucket pivot or swing apart relative to each other when passing over a sprocket of the bucket line. By such pivoting or swinging apart of the bucket from its bottom, the angle between the back wall and bottom of the bucket will be increased, thus breaking the spoil loose from the bottom, back and sides of the bucket so that it will readily discharge due to centrifugal force developed in the bucket line as it passes over the discharge sprocket.

The improved bucket line bar and tooth are characterized by either the tooth or socket therefor being curved and the other straight so that as the tooth is inserted into the socket it is deformed and placed in stress which will increase the friction between the tooth and socket and tend to maintain the tooth in place.

Figure 1:
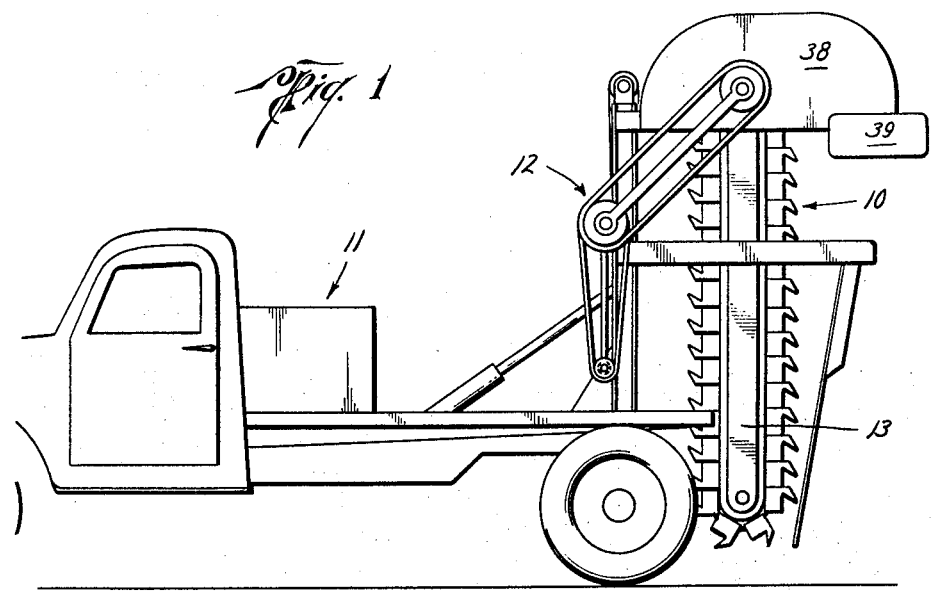
Fig. 1 is a view in side elevation of a trencher having a bucket line constructed in accordance with this invention.
Figure 2:
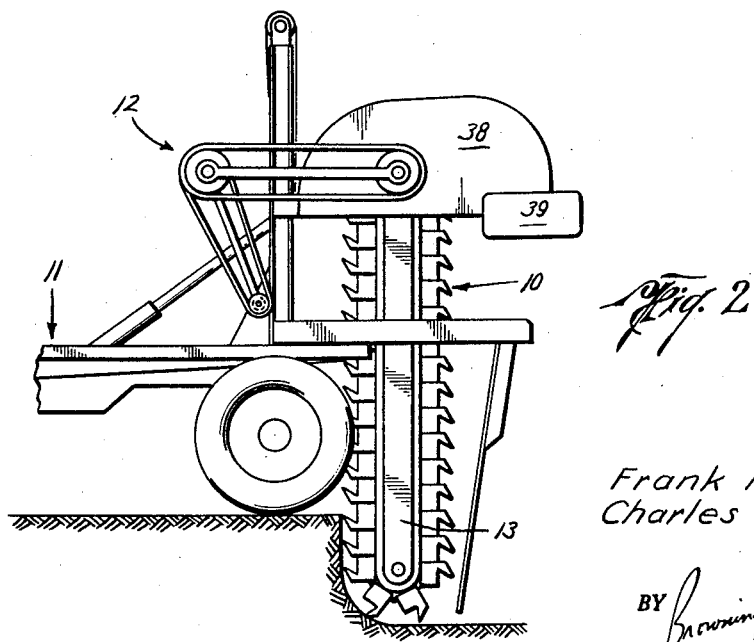
Fig. 2 is a view in side elevation similar to Fig. 1 showing the bucket line digging a trench.

Referring now to the drawings, the bucket line indicated generally at 10 is mounted on a carrier indicated generally at 11 in a manner to permit the bucket line to be moved vertically from the position shown in Fig. 1 to the position shown in Fig. 2 for trenching. The bucket line is operated by a power transmission system including jointed radiating-arm power transfer means 12 which interconnects the bucket line and a shaft which is driven from the truck engine. For a detailed description of the operation of the bucket line carrier and of the power transmitting means, reference is made to our copending application, Serial No. 449,685, filed August 13, 1953, now Patent No. 2,817,911, issued December 31, 1957.

The bucket line 10 is an endless chain of buckets mounted on boom 13 and received about a drive sprocket 14 at the upper end of the boom for operating the bucket line and an idler sprocket at the lower end of the boom 13 whereby the buckets abruptly change their direction of travel 180 degrees when passing over the drive sprocket 14 and over the idler sprocket (not shown).

Referring now to Figs. 3 and 4, it will be seen that the bucket line is made up of a plurality of bottomless buckets indicated generally at 15. Each bucket is made up of a back wall 16, spaced end walls 17 and 18 and a top wall 19. The top wall 19 is secured to and extends outwardly from back wall 16 at a right angle. Each of the end walls 17 and 18 is secured to the top wall 19 and back wall 16 and extends downwardly and outwardly respectively from the top and back walls at right angles. This right angle construction provides a very strong rugged bucket. The lower terminal edges of back wall 16 and end walls 17 and 18 lie in a single plane which extends parallel to the top wall 19 to permit these edges to be positioned closely adjacent the top of a trailing bucket to thereby provide a bottom for the bottomless bucket when the bucket is in a straight portion of the bucket line. If desired, the bucket may be cast or forged as an integral unit. Top 19 is dimensioned to be at least as large as the open bottom of the bucket so as to provide a bottom for the bucket which next precedes it in the bucket line as will hereinafter more fully appear. It is contemplated that top 19 might be carried by the bucket line chain as a separate member and as such coacts with a bucket to provide a bottom therefor, but it is preferred that it be carried by a bucket as shown to reduce the number of necessary parts. End walls 17 and 18 are provided with projecting lugs 17a and 18a on the front of the bucket to which a tooth cutting and retaining bar 20, which extends transversely of the bucket, may be removably secured as by welding or the like with its cutting means extending upwardly and outwardly to shave spoil from a trench. The bottom or trailing side 20a of the tooth bar preferably lies in the plane of the lower terminal edges of the three walls of the bucket and the bar provides a fourth wall to complete a rectangular enclosure in the lower section of the bucket flush with the open bottom thereof. The front of the bucket is left open with the exception of the tooth bar 20 to receive spoil shaved from a trench by the tooth bar and teeth carried thereby.

The buckets are fastened in the bucket line closely adjacent each other by a chain which permits the buckets to pivot relative to each other as they pass over the sprockets and to follow each other closely in the straight portion of the bucket line. The chain is made up of spaced outer links 21 and 22 which the rigidly attached to a plate 23 welded or otherwise secured to the outer face of back wall 16 of the bucket. Bridging inner links 24 and 25 extend between the outer links or adjacent buckets 15 and are pivoted thereto by pivot pins 26 and 27. A roller 28 is received about each pin and between the inner links 24 and 25. Roller 28 maintains the inner links in spaced relationship and provides a wear member for engagement with the teeth of the sprockets on which the bucket line runs. Pivot pins 26 and 27 are spaced equidistant from each other a distance to space rollers 28 for engagement with the teeth of the sprockets on which the bucket line runs. The buckets 15 are dimensioned relative to the chain so that one bucket is carried by each set of outer links 21 and 22 with the buckets closely adjacent each other when in a straight portion of the bucket line. Preferably, the clearance between adjacent buckets is just sufficient to permit the chain to straighten out without the buckets binding on each other. As the bottom of each bucket overlies the top of the next adjacent trailing bucket when the two buckets are in a straight portion of the bucket line, the top of the trailing bucket will provide a bottom for the lead bucket while the buckets are in the digging portion of the bucket line. As they break over a sprocket they will spread apart to break loose any spoil stuck in the bucket.

Referring now to Fig. 3, the coaction of the several bottomless buckets in a manner to permit top 19 of a trailing bucket to provide a bottom for a lead bucket while the buckets are in a straight portion of the bucket line and in which adjacent buckets will pivot to spread apart as the buckets pass over a bucket, thus loosening sticky spoil therein, is shown. Beginning at the lower left and working clockwise of Fig. 3, the first and second buckets 15a and 15b are shown to be in a straight section of the bucket line. When so positioned, the top 19 of bucket 15a forms a bottom for bucket 15b and spoil shaved from a trench by tooth bar 20 will fall into bucket 15b and be retained therein by bottom 19 of bucket 15a. As shown in Figs. 1 and 2, these buckets will be in the position shown in 15a and 15b from a point just above the bottom of the trench being dug upward to the top of the trench. As shown in Fig. 3, the buckets will remain in this position until they reach the top or drive sprocket indicated at 14. In digging the bottom of the trench, the bottom of the buckets are, of course, open as shown in Fig. 2. However, it will be remembered that the buckets in traveling over the idler sprocket at the bottom of boom 13 are traveling at an increased rate and the speed of movement of these buckets will throw spoil shaved from the bottom of the ditch forward and upward and by the time the spoil has fallen back into the bucket the bucket will have closed thus retaining the spoil therein. As shown in Fig. 2, the broad face of tooth bar 20 and the teeth carried thereby will be substantially perpendicular to the bottom or wall being shaved thereby as the buckets pass over the sprocket on the lower end of boom 13 and hence will tend to push spoil shaved from the trench forward and upward giving the buckets a chance to close before the spoil falls into the buckets. Any spoil which should drop through a bucket will be picked up by one of the succeeding buckets and no difficulty is experienced in removing spoil from the bottom of the ditch. As the buckets reach the point in the bucket line occupied by bucket 15c, they begin to pivot relative to each other as they break over drive sprocket 14. In so doing the back wall 16 of a lead bucket will pivot away from the top 19 of an adjacent trailing bucket and increase the angle between wall 16 and top 19 of adjacent buckets. This relative movement between bucket 15c and its bottom, which is provided by top 19 of bucket 15b, will loosen spoil from the several walls of bucket 15c. As the buckets pass through the positions occupied by buckets 15c and 15d, they are accelerated and considerable centrifugal force is developed by the time the buckets reach the point occupied by bucket 15e. Beginning at approximately the position of bucket 15d, that is, when the broad face of top 19 of bucket 15d passes through the vertical and beyond, the spoil within the bucket will be discharged by centrifugal force upwardly and rearwardly of the bucket line. By rearwardly is meant to the rear of the trencher shown in Fig. 1. It has been found that this discharge will be at approximately a 45 degree angle from the vertical. Discharge of spoil will take place both through the open front of the bucket and through the open bottom and the buckets are self-cleaning without the necessity of any extraneous scrapers or the like to clean the buckets as they go over the drive sprocket 14. The open front and bottom of the buckets provide a much larger opening during discharge of spoil than during the digging operation and insure that all spoil is thrown from the buckets before they leave drive sprocket 14.

Spoil so discharged strikes deflector hood 38 and falls upon a conveyer belt indicated generally at 39 which discharges the spoil at the side of the trench.

Referring to Fig. 5, there is indicated generally at 29 a tooth adapted to be carried in tooth bar 20 and to loosen spoil from a trench being dug. Tooth 29 is provided with a blade portion 30 and a shank portion 31. The shank portion is essentially rectangular in cross section with the broad face 31a of the shank portion and the broad face on the opposite side of the tooth from face 31a extending substantially parallel to each other. The opposite side faces 31b and 31c of shank portion 31 are tapered inwardly away from the cutting portion 30 of the tooth. The shank 31 terminates in an ear 32 which is bent after the tooth is inserted into the tooth bar to retain the tooth in the bar. Tooth bar 20 is provided with sockets 33 which are provided with opposed parallel walls 33a and 33b and opposed inwardly tapering walls (shown in dotted outline in Fig. 4) dimensioned to snugly receive shank 31 of tooth 29 with ear 32 projecting through a hole 33c in tooth bar 20 at the bottom of socket 33. After the tooth 29 is wedged in place, ear 32 is bent to overlie the lower wall 20a of tooth bar 20 and provide a means for maintaining the tooth in the socket. While the digging operation tends to wedge tooth 29 tighter in socket 33, there is a tendency for the tooth to be thrown out of the socket as it is passing over the sprockets of the bucket line and for this reason the bent ear 32 is needed to maintain the tooth in the socket.

Referring to Fig. 6, there is shown a modified form of tooth in which the tooth is stressed when inserted in socket 33 to provide increased friction between the tooth and tooth bar to assist in maintaining the tooth in the tooth bar. The tooth bar 20 is the same as employed with the tooth shown in Fig. 5. The tooth indicated generally at 34 is fabricated with a slight curve in the shank portion of the tooth. This slight curve is exaggerated in the drawing for purposes of illustration. The curved portion of tooth 34 extends substantially the entire length of shank portion 34a of the tooth. The tooth socket 33 is provided with opposed parallel planar walls 33a and 33b which are adapted to engage the curved walls 34b and 34c of shank portion 34a. The curve of shank 34a is such that the tooth must be deformed in inserting the tooth into socket 33. This will result in stressing of the tooth and building up high frictional values between the tooth walls and the walls of socket 33 which will tend to maintain the tooth 34 in the socket. An ear 35 similar to ear 32 is provided and may be bent over the lower face 20a of tooth bar 20 to assist in maintaining the tooth in the socket.

Referring to Fig. 7, there is shown another form of tooth 36 which may be employed with tooth bar 20. Tooth 36 has a curved shank portion 36a to provide opposed curved surfaces 36b and 36c which coact with the walls 33a and 33b of socket 33 in the same manner as the tooth 34 of the Fig. 6 embodiment to cause the tooth 36 to be deformed when inserted into socket 33 and to be under stress when fully inserted in the socket so that the frictional values developed by this stress will tend to maintain the tooth in the socket. Tooth 36 differs from tooth 34 in that in place of ear 35 on the end of the shank portion of the tooth there is provided a laterally offset lug portion 37 which, when the tooth is fully inserted, extends beyond the tooth socket and will be moved laterally of the tooth socket by the forces stressing tooth 36 and snapped into a position to overlie bottom wall 20a of tooth bar 20. The lug 37 should be dimensioned so as to permit passage thereof through tooth socket 33 and should have a surface 37a extending laterally of the tooth and adapted to engage surface 20a of tooth bar 20 and when in engagement to prevent the removal of tooth 36 from tooth bar 20. If desired, the curve in tooth 36 may be such that after lug 37 is snapped into place tooth 36 may still be under stress to assist in holding tooth 36 in the socket.

Each of teeth 34 and 36 is provided with shanks which are tapered as in the manner of shank 31 of the Fig. 5 tooth to maintain the teeth in the tooth bar 20 during the digging operation.

From the above it will be seen that there has been provided a bucket line in which the buckets are self-cleaning without the use of extraneous cleaners, scrapers, links, or the like. The buckets, when in the discharge portion of the bucket line, have both their front and bottom open to permit the discharge of spoil from both of these openings. The self-cleaning feature is provided without the addition of a single additional member, thus eliminating the cost of the usual cleaner members both as an initial investment and as an item of replacement. As the buckets may be placed immediately adjacent each other the maximum number of buckets per foot of bucket line may be used providing for maximum bucket line efficiency.

A bucket and tooth bar structure has been provided in which the tooth bar and teeth carried thereby may be replaced without replacing the remainder of the bucket and the individual teeth may be replaced in the tooth bar. As both the tooth bar and the teeth are subject to wear during digging, these elements can be replaced from time to time using the same basic bucket.

There has also been provided an improved form of tooth which is under stress when received in the tooth socket to develop high frictional values between the tooth and tooth socket which tend to retain the tooth in the socket. The tooth is provided with either a lug which may be bent over the bottom wall of the tooth bar to assist in retaining the tooth in the socket or a snap-over lug which snaps into place to engage the bottom wall of the tooth bar and assist in maintaining the tooth in place in the socket.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An endless bucket line comprising, a lead bucket having a back wall, an opening in its front for receiving scooped up spoil and an open bottom, and a retaining bar extending across the trailing portion of the front and closing the same substantially flush with the bottom of the bucket, a trailing bucket positioned in the bucket line closely adjacent the lead bucket and having a closed top, said closed top providing a bottom for the lead bucket when the two buckets are in a substantially straight portion of the bucket line, said buckets spreading apart and increasing the angle between the back wall of the lead bucket and the top of the trailing bucket when the buckets are in a curved portion of the bucket line, whereby spoil in the lead bucket will be broken free from the bucket as it passes through a curved portion of the bucket line and will be discharged from the bucket through its front and bottom.

2. An endless bucket line comprising, a two-piece bucket having a leading portion and a trailing portion, said leading portion having a back wall, an opening in its front for receiving scooped up spoil and an open bottom, and a retaining bar extending across the trailing portion of the front and closing the same substantially flush with the bottom of the bucket, said trailing portion providing a bottom for the bucket when the two portions are traveling in a substantially straight path, and means for separately connecting the portions of the bucket in the bucket line closely adjacent each other, said connecting means providing for pivotal movement of the two portions relative to each other while the parts are changing their direction of travel to swing the bottom open relative to the remainder of the bucket and increase the angle between the bottom and back wall whereby spoil in the bucket will be broken loose from the bucket as the parts change their direction of travel.

3. An endless bucket line comprising, a lead bucket having a back wall, an opening in its front for receiving scooped up spoil and an open bottom, and a retaining bar extending across the trailing portion of the front and closing the same, a trailing bucket having a closed top providing a bottom for the lead bucket when the two buckets are traveling in a substantially straight path, and means for separately connecting the buckets in the bucket line with the trailing bucket closely adjacent the lead bucket, said connecting means providing for pivotal movement of the two buckets relative to each other while the buckets are changing their direction of travel to swing the lead bucket away from the top of the trailing bucket and increase the angle between the back wall of the lead bucket and the top of the trailing bucket when the buckets are in a curved portion of the bucket line whereby spoil in the buckets will be broken loose from the buckets as they change their direction of travel.

4. The bucket line of claim 3 wherein the bar is a tooth bar provided with digging teeth projecting forwardly in the direction of movement of the bucket line and toward the front of the lead bucket to loosen spoil and direct it into the lead bucket.

5. An endless bucket line comprising, a plurality of buckets, and means for separately connecting the buckets in the bucket line with the buckets closely adjacent each other, each of said buckets having a top, a back wall, end walls and a retaining tooth bar extending from end wall to end wall across the trailing portion of the front of the bucket, and closing the same substantially flush with the bottom of the bucket, said bucket being open across the front in advance of the tooth bar and having an open bottom, the bottom of each bucket being closed by the top of the immediately trailing bucket when the buckets are in a straight portion of the bucket line, adjacent buckets swinging away from each other and increasing the angle between the back wall of a lead bucket and the top of a trailing bucket while the buckets are in a curved portion of the bucket line to loosen spoil from the buckets.

6. As a subcombination a bucket comprising, a back wall, a top wall, spaced end walls, an opening in the front of the bucket for receiving spoil, and an open bottom, and a retaining bar closing the trailing portion of the front, said top wall dimensioned to be as large as the open bottom of the bucket whereby when two of the buckets are placed one immediately adjacent to and above the other in a bucket line the bottom of the upper bucket will be closed by the top wall of the lower bucket.

7. As a subcombination a bucket comprising, a back wall, a top wall, spaced end walls, an opening in the front of the bucket for receiving spoil, a tooth bar removably carried by the end walls and extending across a trailing portion of the front of the bucket, and an open bottom, said top wall dimensioned to be as large as the open bottom of the bucket whereby when two of the buckets are placed one immediately adjacent to and above the other the bottom of the upper bucket will be closed by the top wall of the lower bucket.

References Cited in the file of this patent

UNITED STATES PATENTS

| | | |
|---|---|---|
| 740,499 | White | Oct. 6, 1903 |
| 1,267,058 | Clarkson | May 21, 1918 |
| 1,762,569 | Barber | June 10, 1930 |
| 1,802,106 | Bosworth | Apr. 21, 1931 |
| 1,825,258 | Barber | Sept. 29, 1931 |
| 1,978,733 | Yocum | Oct. 30, 1934 |
| 2,274,970 | Tiffany | Mar. 3, 1942 |
| 2,353,685 | Askue | July 18, 1944 |
| 2,472,892 | George | June 14, 1949 |
| 2,594,991 | Protzeller | Apr. 29, 1952 |
| 2,607,136 | Hellums | Aug. 19, 1952 |
| 2,667,709 | Askue | Feb. 2, 1954 |
| 2,671,282 | Gardner et al. | Mar. 9, 1954 |

FOREIGN PATENTS

| | | |
|---|---|---|
| 361,460 | Great Britain | Nov. 26, 1931 |